United States Patent [19]

Gemp et al.

[11] 4,159,513
[45] Jun. 26, 1979

[54] STATIC CONTROLLED AC MOTOR DRIVE HAVING PLUG REVERSAL CAPABILITY

[75] Inventors: Robert S. Gemp, Amherst, N.Y.; Alberto Abbondanti, Pittsburgh, Pa.

[73] Assignee: Westinghouse Electric Corp., Pittsburgh, Pa.

[21] Appl. No.: 838,335

[22] Filed: Sep. 30, 1977

[51] Int. Cl.² ............................................. H02M 1/12
[52] U.S. Cl. ........................................ 363/43; 363/71
[58] Field of Search ..................... 363/39, 40, 43, 71, 363/9

[56] References Cited

U.S. PATENT DOCUMENTS

| | | | |
|---|---|---|---|
| 3,491,282 | 1/1970 | Heinrich et al. | 363/43 |
| 3,950,692 | 4/1976 | Smolnikov et al. | 363/71 |
| 4,017,744 | 4/1977 | Johnson | 363/160 |

Primary Examiner—William M. Shoop
Attorney, Agent, or Firm—C. M. Lorin

[57] ABSTRACT

Plug reversal of an induction motor supplied by an N-stage inverter system operating under harmonic neutralization technique is provided by reversing the polarity of the square-shaped voltages combined at $\pi/N$ from each other and by reversing at the same time the sequence of the stages as well as the logic of dissection of the reference time wave. A mirror image of the time scale is effected at the instant of reversal. Digital means are used. Reversible ramp forming generators of the UP-DOWN type are associated in each stage with a phase shifter in order to create the mirror image of the logic controlling the inverter system. A reversible ring counter is used to reverse the sequence of the stages. A reversible pulse generator is used to accommodate an integer number of elementary time intervals in each ramp and between each ramp for the given number of stages.

13 Claims, 23 Drawing Figures

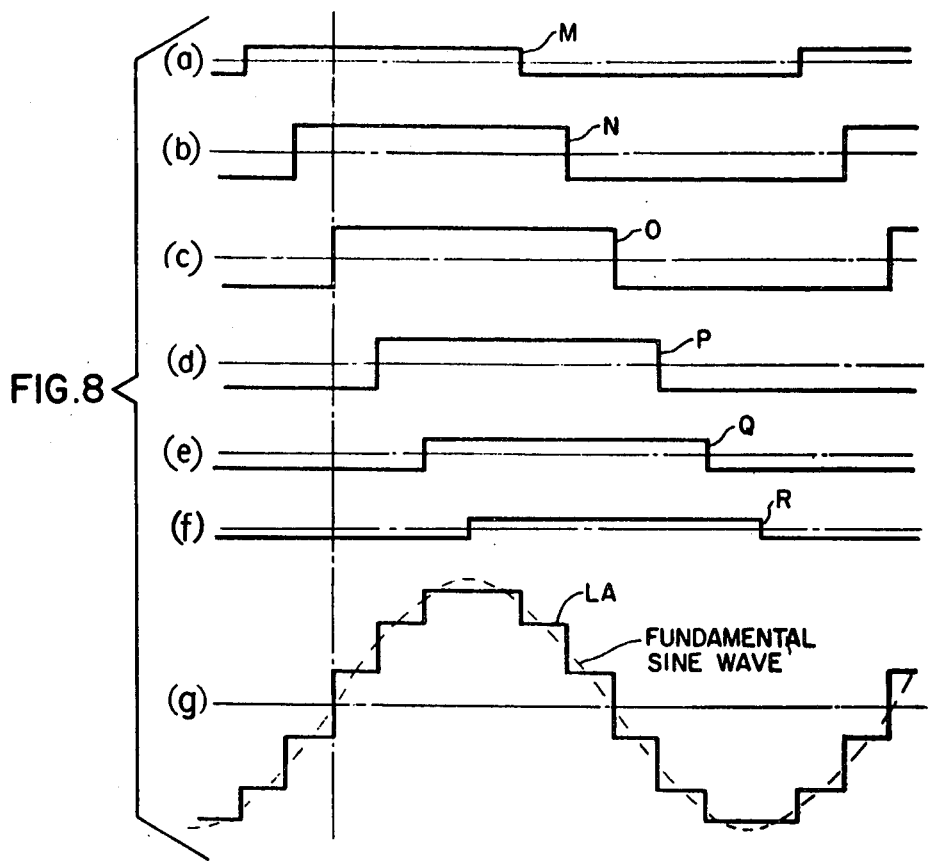
FIG. 8
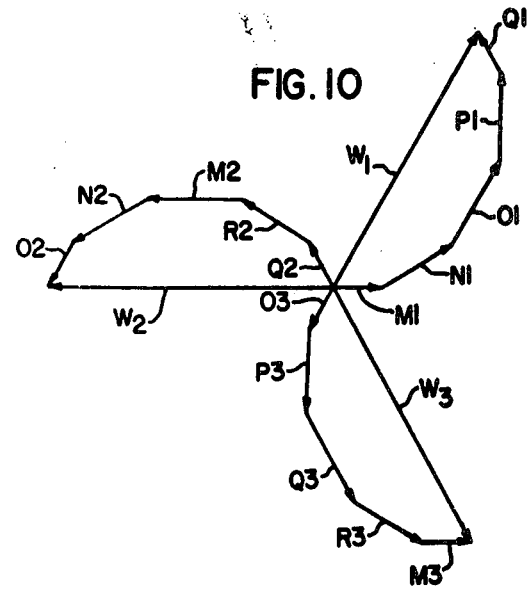
FIG. 9
| TRANSFORMER | WINDING | RELATIVE RATED VOLTAGE |
|---|---|---|
| TM | T1 | $\sqrt{3}$ |
| TM | T2 | $2\sqrt{3}$ |
| TM | T3 | $\sqrt{3}$ |
| TN | T1 | 3.0 |
| TN | T2 | 3.0 |
| TO | T1 | $2\sqrt{3}$ |
| TO | T2 | $\sqrt{3}$ |
| TO | T3 | $\sqrt{3}$ |
| TP | T1 | 3.0 |
| TP | T3 | 3.0 |
| TQ | T1 | $\sqrt{3}$ |
| TQ | T2 | $\sqrt{3}$ |
| TQ | T3 | $2\sqrt{3}$ |
| TR | T2 | 3.0 |
| TR | T3 | 3.0 |
FIG. 10

STATIC CONTROLLED AC MOTOR DRIVE HAVING PLUG REVERSAL CAPABILITY

BACKGROUND OF THE INVENTION

The present invention addresses itself to the problem of plug reversal in a motor drive of the static controlled polyphase AC type, in particular for a drive accommodating adjustments in voltage and frequency for load regulation and control. It is not new to cause a reversal of direction of operation of a motor without stoppage. This can be done with a three-phase motor for instance by merely exchanging two phases at the stator input. However, when a motor is abruptly impelled to reverse its speed, the magnetic flux already created usually will prevent an immediate adjustment of the internal magnetic conditions to new electrical conditions imposed by the power source.

The invention proposes to supply the load with an alternating current voltage which is so produced at the instant of reversal that no such adverse effects as saturation by accumulated inductive energy, or a direct current component in the induced flux will occur.

The solution to the problem proposed by the instant invention consists in replacing at the instant of reversal the supplied AC voltage in each phase by an alternating voltage waveform of same amplitude and frequency but with a lagging phase shift of twice the time expanded into the operating quadrant at the time of reversal since the last cross-over point. When this condition is fulfilled the flux inducing voltage waveform accepts a center of symmetry on the axis at the instant of reversal which eliminates the adverse effects, and between the phases reversal takes place.

This invention is based on the observation that such lagging phase shift of twice the electrical angle since the last cross-over has the same effect as if the waveform had been given reverse polarity by a pi-phase shift and if from the operating point on such reverse waveform the progression on the trajectory were retraced back in time across the same electrical angle as reached from cross-over at the time of reversal on the direct waveform. In other words, the mirror image of a time progression is developed from the time of reversal concurrently with a change of polarity.

It is also known to generate an AC voltage wave of given amplitude and frequency with static switches so controlled as a function of time that elementary portions of the desired waveform are actually generated and combined so as to reconstruct the intended output wave. An illustration of this technique can be found in U.S. Pat. No. 3,491,282 of T. M. Heinrich et al.

It is further known to use digital counter means in order to recurrently generate a time representation of a quadrant of the intended sine wave. The accumulated count at any given time is in time relation with one operative point on the output wave within the quadrant. When the counter is allowed to count up and down throughout the half-cycle, the time representation extends from one cross-over to the next. The system otherwise recognizes synchronously the polarity changes in the outputted voltage. This invention takes advantage of the availability of these techniques, and typically those shown in patent applications Ser. No. 728,710 of A. Abbondanti (W. E. Case 46,515) filed Oct. 1, 1976 and Ser. No. 774,726 of R. Gemp (W. E. Case 46,961) filed Mar. 7, 1977.

The invention proposes at the instant of reversal to count back under digital control the time elapsed since the last cross-over. At the same time, and synchronously therewith, the waveform reconstruction is so inverted in polarity and reversed in the sequence of the reconstructing stages that the vectorial reversing effect is obtained with the outputted voltage wave supplied to the motor.

More specifically, the present invention relates to voltage controlled AC static power supplies of the harmonic neutralization type such as disclosed in U.S. Pat. No. 3,491,282 of T. M. Heinrich et al, entitled "Static Inverter Wherein A Plurality Of Square Waves Are So Summed As To Produce A Sinusoidal Output Wave". As explained in the patent, this technique consists in generating, with N inverters, a plurality of pulses of the same amplitude, at the same repetitive rate, spaced from each other between inverter stages by the same electrical angle $\pi/N$. The outputted pulses are amplified by N respective stage transformers having winding ratios which follow a cosine law from one to the next. The secondary windings are connected in series to sum up the dimensioned pulses, whereby a polyphase output waveform is obtained by vector addition through the transformer secondaries. The Heinrich Patent also describes how the AC output voltage of such a static generator can be controlled by varying the time of conduction of the thyristors in the inverters of each stage. Two modes of controlling the output voltage are disclosed in the Heinrich patent. One mode uses pulse width modulation; the second mode uses phase shifting. The present invention is applicable to this second mode of control of the inverters.

It is generally known to generate N square pulses staggered by $\pi/N$ from one another with two square pulse signals one at the fundamental frequency, the other in the form of a train of pulses at 2 N times the fundamental frequency, the two signals being applied to an N-stage shift register. Such staggered set of pulses may be used in accordance with the harmonic neutralization technique of the aforementioned Heinrich Patent.

An object of the present invention is to provide a voltage-controlled static AC power supply wherein digital technique is used to generate a pulse width controlled signal for the purpose of reconstructing at a given instant a fundamental sinusoidal wave of controlled voltage which is shifted by a given phase angle from a first reconstructed fundamental sinusoidal wave.

Another object of the present invention is to provide a novel and unique type of static and digitally controlled AC motor drive capable of plug reversal by digital control.

Still another object of the present invention is by static switches under DC power to reconstruct a symmetrical set of rotating voltage and current vectors and to control the static switches to instantaneously reverse the rotation of the vectors.

A further object of the present invention is to provide an N-stage inverter system for a harmonic neutralized static power generator in which an N-stage phase shifter arrangement is so controlled as to provide for instantaneous reversal of the outputted waveform.

SUMMARY OF THE INVENTION

In accordance with the present invention means is associated with a static generator for the generation of a reconstructed sine wave of given frequency and voltage through harmonic neutralization techniques for providing instant reversal of the outputted wave at any selected moment within the cycle thereof.

More generally, the reversed reconstructed sine wave obtained after reversal is a sine wave lagging, by twice the electrical angle following cross-over at the instant of reversal, in relation to the reconstructed sine wave before reversal.

The invention also provides for sine wave reversal in combination with automatic frequency and/or voltage adjustment in the outputted waveform.

The invention further contemplates a motor drive supplied with a voltage of sinusoidal shape at selected frequency and voltage as derived by harmonic neutralization techniques, in which plug reversal is achieved by controlling the operation of the associated harmonic neutralization system. Plug reversal in such a motor drive is performed by concurrently reversing the polarity and logic sequence of the elementary pulses generated by the inverter stages contributing in reconstructing the fundamental voltage wave applied to the driven motor and the phase sequence of the controlled inverter system.

BRIEF DESCRIPTION OF THE DRAWINGS

FIG. 8 typically shows curves used to reconstruct a fundamental sinusoidal output wave with the system of FIG. 6;

FIG. 9 is a table of the dimensioning transformer ratios used in the embodiment of FIG. 6;

FIG. 10 is a vectorial representation of the three phase voltage outputted by the circuit of FIGS. 6 and 9;

DESCRIPTION OF THE PREFERRED EMBODIMENT

The invention will be described in the context of a static controlled AC motor drive, and more particularly with a control system using harmonic neutralization techniques such as disclosed in the aforementioned Heinrich patent.

The systems described in the prior art are mostly intended for unidirectional drives with the output frequency adjustable from zero to some maximum value providing a speed variation from zero rpm to a maximum speed in a given direction that we shall define as "forward". It is desirable though in some drives of providing speed variation not only down to zero rpm, but also continuously through zero rpm from the forward direction to the reverse direction.

There is a trivial way of implementing the reversal of the direction of rotation in an induction motor, which is the sudden alteration of the voltage phase sequence at the motor terminals, obtained by interchanging two wires. An identical result can easily be accomplished electronically with static control by merely interchanging the clock signals applied to the devices routing the output sine waves for two phases.

Figure 1A:
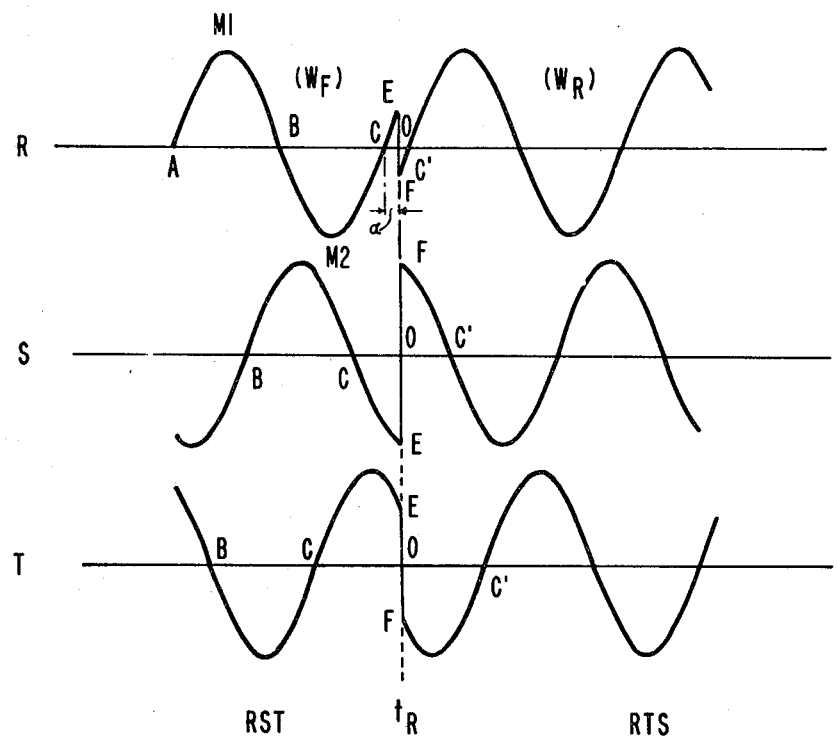
FIG. 1A represents the fundamental waves of the three line-to-neutral stator voltages of an induction motor for uninterrupted forward and reverse operation in accordance with the invention.

Unfortunately, the phase reversal accomplished in such manner produces a temporary disturbance in the machine level of excitation. Depending on the moment the phase exchange occurs, the flux can reach saturation level in one or more phases while another phase can become badly under-excited. As a result, one can observe some torque fluctuations (cogging) immediately after reversal and if the transition through zero rpm occurs under load, the motor may pull out. To improve the smoothness of reversal it is necessary to invert the phase sequence without affecting the magnitude of the flux space vector rotating in the machine airgap. At the instant of reversal, that vector should cease its forward rotation and start rotating in the reverse direction without changing amplitude. If the components of the flux space vector derived by harmonic neutralization techniques are viewed as pulsating flux vectors whose instantaneous value is proportional to the integral of the applied voltages, the changes to apply to said voltages to implement a reversal in the desired manner are as shown in FIG. 1A. FIG. 1A represents the fundamentals of the three line-to-neutral stator voltages. Reversal is accomplished at the instant $t_R$ and the forward and reverse frequency and amplitude are assumed constant. At the moment of reversal, two effects must take place. First, the three sinusoids must start to be "traced backwards", i.e., the argument whose sine is taken and which was increasing with time before reversal must start decreasing with time at the same rate. Secondly, the polarity of all the sinusoids must simultaneously be reversed. If the stator drops were nonexistent, this procedure would accomplish a perfectly smooth reversal. The presence of stator drops causes some residual flux perturbations, but the drive behavior is still greatly improved if this procedure is followed instead of the simple wire exchange approach described earlier.

Figure 1B:
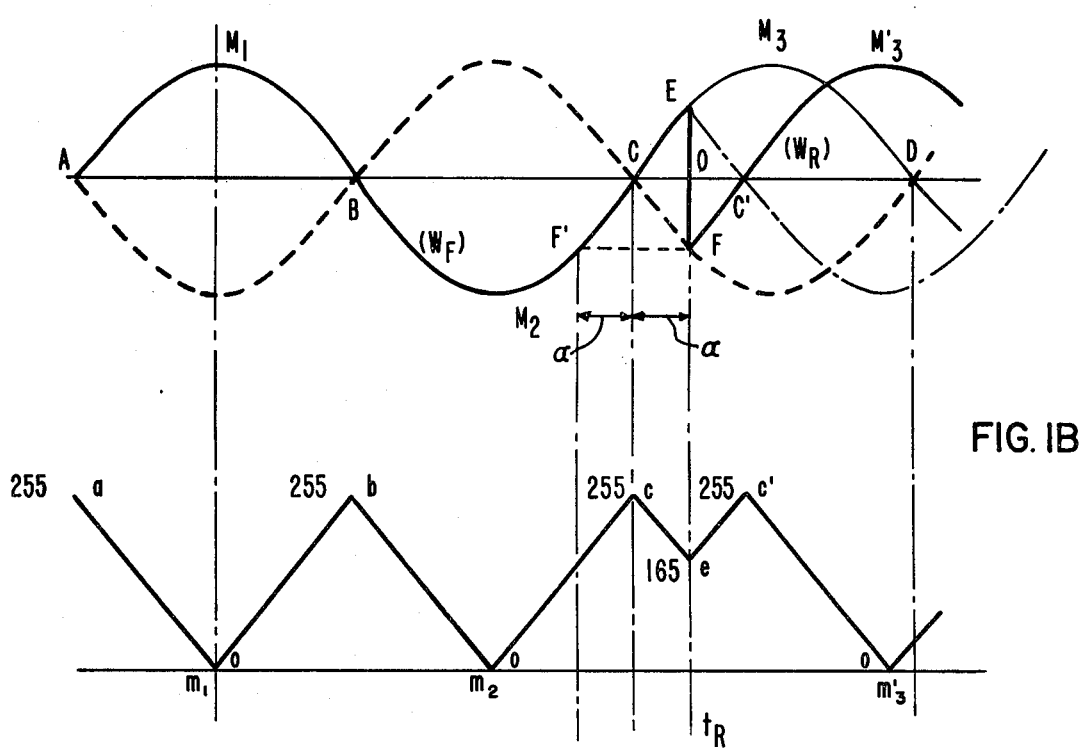
FIG. 1B explains with curves the generation of a phase voltage such as shown in FIG. 1A.

Referring to FIG. 1A, the three phases of a voltage supply to an induction motor are illustratively shown in succession as RST until an instant $t_R$ for which reversal of speed is intended. Consider phase R on the forward curve ($W_F$) at time $t_R$ (e.g. at an electrical angle $\alpha$ from the last cross-over point). If reversals were done only by polarity changes, the operative point which passes abruptly from E to F would be leaving curve ($W_F$) at E to become F on a reverse wave (shown in dotted line) namely a curve shifted by (pi) in relation to the direct phase wave. This is undesirable as shown in FIG. 1B curve (a), since the progression on the dotted line from F to D could lead to saturation, and also introduce a direct current component of the flux.

In order to obtain symmetry during reversal, in accordance with the present invention, the reverse curve effectively used as trajectory of the operating points after instant $t_R$, is so chosen ($W_R$) that there is a center of symmetry at the instant of reversal, e.g., at 0 on the time axis. When this occurs, the areas sustained by curve segment CE on curve ($W_F$) and by curve segment FC' on curve ($W_R$) are equal. As a result the adverse effects earlier mentioned do not exist in the zone of transition (from cross-over point C of $W_F$ to cross-over point C' of $W_R$). If this is done concurrently for the three phases (FIG. 1A) it appears that the order of succession of the three phases RST has been effectively reversed. The vectorial diagram is now turning in the opposite direction, and the rotation of the motor has become reversed as desired. Considering again curves (a) of FIG. 1B, it is seen that the intended curve ($W_R$) represents, following the polarity reversal EF, a regression, back in time from E to F' on curve ($W_F$) in order to be positioned at operative point F'. It is also seen that, at instant $t_R$ the trajectory will become FC' if curve ($W_R$) is derived from curve ($W_F$) by a lagging shift of 2 $\alpha$, which effect results from 1) a reversal of polarity and 2) a retrace of the trajectory from E back to cross-over point C, (thus like going from E to C' as shown) and so on. The mechanics of a 2 $\alpha$ lagging phase shift are thus a polarity inversion plus a time reversal. This concept is illustrated further in FIG. 1B by curves (b) which are timed representations of the operating point from quadrant to quadrant between two successive cross-over points. On the direct curve ($W_F$) the time representation is given by a succession of ramps $am_1$, $m_1b$, $bm_2$ and $m_2c$ which in accordance with the trajectory followed correspond in time to operating points $AM_1BM_2C$. While still on curve ($W_F$) the operating point goes from C to E until the instant of reversal $t_R$. When at E the polarity is inverted, the operating point becomes F. At the same time, the slope of the ramp is also reversed and counting in the reverse direction brings the operating point to C' on ($W_R$). The ramp further proceeds as if on ($W_F$) from C to $M_2$, actually from C' to $M'_3$ on ($W_R$). The ramps are created by a 8-bit digital counter which counts 256 steps from 255 to 0. For electrical angle $\alpha$ the portion ce is assumed to be of 90 steps. The cross-over point C' of the reverse wave ($W_R$) from phase R, is thus at $2 \times 90 = 180$ steps from cross-over point C on the forward curve ($W_F$) for phase R. The same obtains, with different electrical angles for the other phases.

Figure 2:
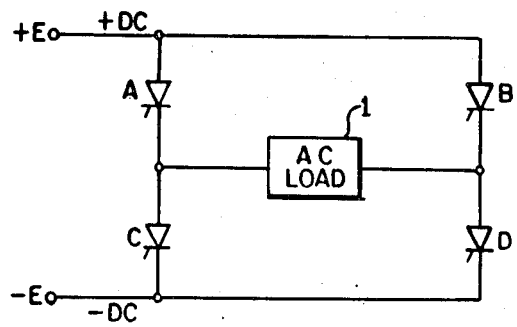
FIG. 2 is a schematic representation of an inverter coupled between a DC source and an AC load.
Figure 3:
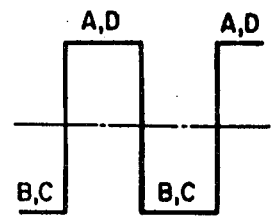
FIG. 3 typically shows as a function of time AC voltage generated by the inverter of FIG. 1.

The preceding considerations will be further developed when explaining hereinafter how digital control can be applied to effectively create ($W_R$) curves for each phase, at the instant of reversal, with an N-stage inverter system controlled by N-phase shifters using the technique of the Heinrich patent to form square-shaped voltage waves which are combined between the secondary windings of a multi-winding transformer arrangement. These explanations will be preceded by a review of harmonic neutralization by reference to FIGS. 2 to 10 as follows:

FIG. 2 is a simplified schematic representation of an inverter circuit using thyristors A, B, C, D as power switching devices connected between the direct current terminals of a DC source having +E volts and −E volts polarities. The alternating current load 1 is alternatively traversed by energy in either direction via pairs of thyristors B,C and A,D as shown in FIG. 3 thereby to generate alternating current.

Control of the voltage at the output of the inverter is schematized by FIGS. 4A–4D and 5.

Figure 4A:
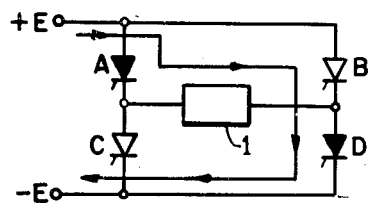
FIGS. 4A–4D illustrate the operation of the inverter of FIG. 2 for voltage control.
Figure 4B:
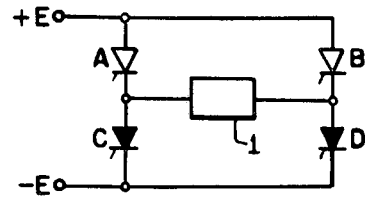
Figure 4C:
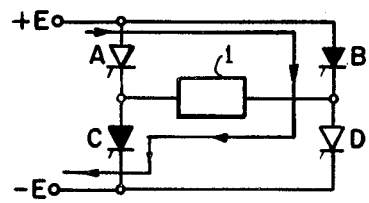
Figure 4D:
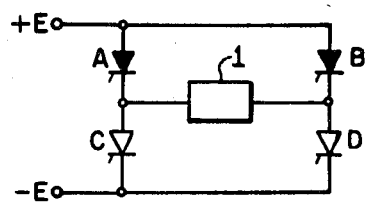
Figure 5:
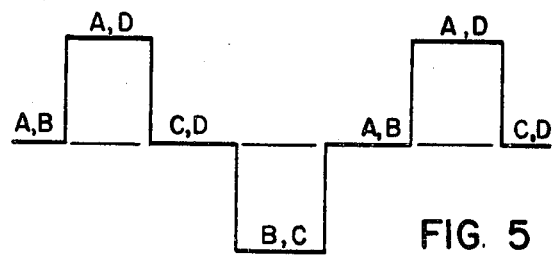
FIG. 5 is the AC voltage generated during pulse width control.

By controlling the time of conduction of thyristors A,D according to the scheme of FIGS. 4A–4D controlled times of conduction (A,D) and (B,C) are obtained representing passage of energy through the load in one and the other direction, as shown in FIG. 5. The overall waveform represents voltage across the load. FIG. 4A shows the positive half cycle (A,D). FIG. 4B illustrates zero voltage due to thyristors C and D being conducting to apply the same voltage at both ends of the load. FIG. 4C shows the negative half cycle (B,C). FIG. 4D is the zero voltage conduction due to concurrent firing of thyristors A,B.

Figure 6:
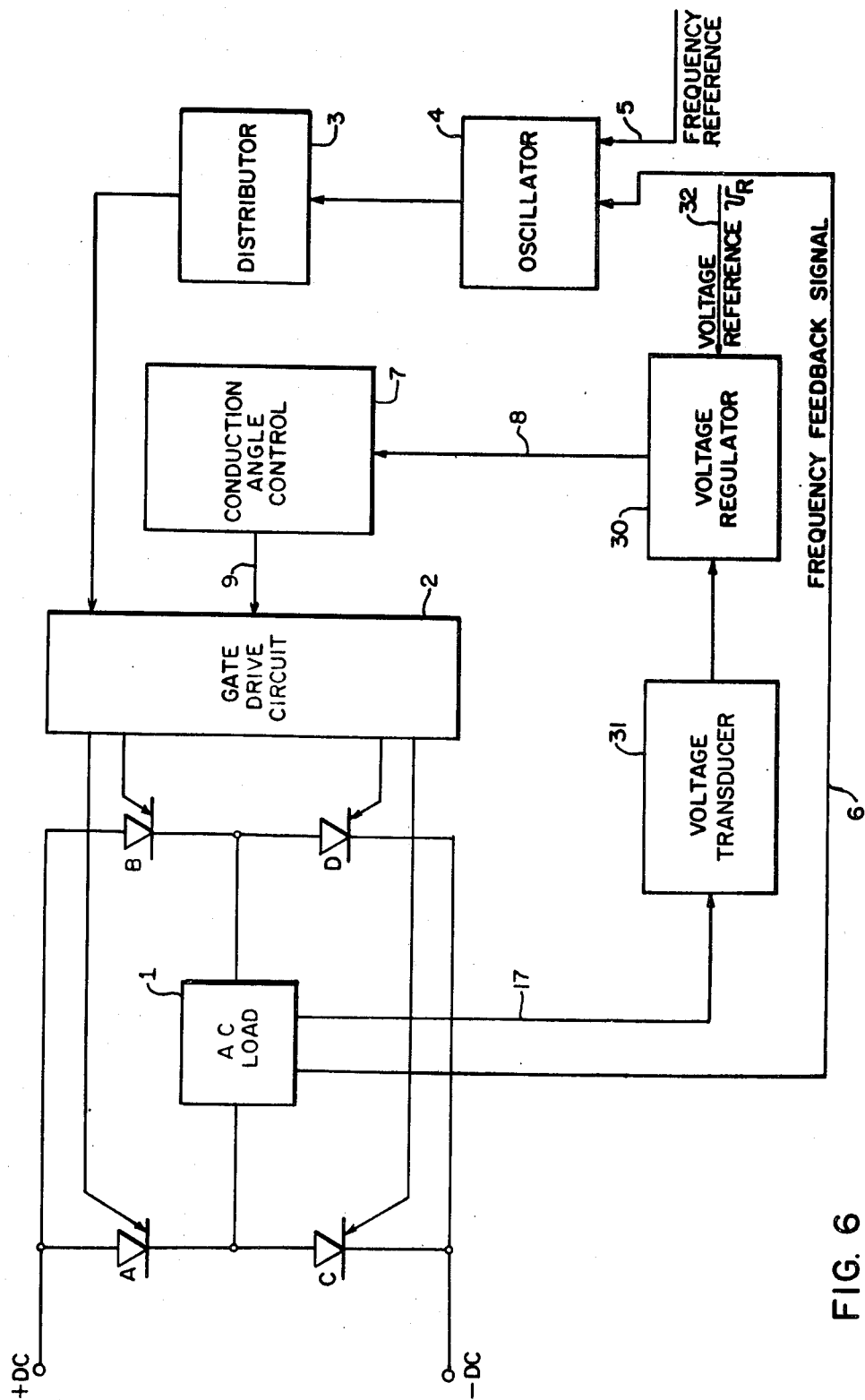
FIG. 6 is a schematic representation of a typical inverter voltage and frequency control system.

Referring to FIG. 6, an inverter circuit such as the one of FIG. 2 is shown coupled to a load 1 and controlled for variable frequency of operation while being voltage regulated. Thyristors A to D are selectively cyclically and sequentially fired by a gate drive circuit 2 in accordance with the logic of a distributor 3 having a cycle frequency defined by an oscillator 4. The frequency of the oscillator is adjusted at various settings by a frequency reference on line 5. If necessary a frequency feedback signal derived from load 1 is applied via line 6 to the oscillator for regulation purpose. A conduction time control circuit 7 is connected to the gate drive circuit 2 in order to establish a desired pulse width for the output wave as has been explained by reference to FIG. 5, thereby to control the voltage across the AC load. For the purpose of illustration only, the inverter circuit of FIG. 6 is shown with a voltage regulator 30 is connected in a close voltage control loop comprising a voltage transducer 31 responsive to a feedback voltage signal derived from the load on line 17. It is understood that the inverter circuit of FIG. 6 could be of the type in which the output voltage is regulated irrespective of the frequency. The voltage regulator 30 generates a voltage control signal applied via line 8 to the conduction time control circuit 7.

Assuming the frequency of operation constant, any change in the feedback signal of line 17 yields a change in the voltage control signal on line 8 thereby to effectively cause a change in the conduction time, e.g., the electric angle during which DC energy is passing through the load via conducting thyristors, namely, (A,D) or (B,C) on FIG. 5.

Figure 7:
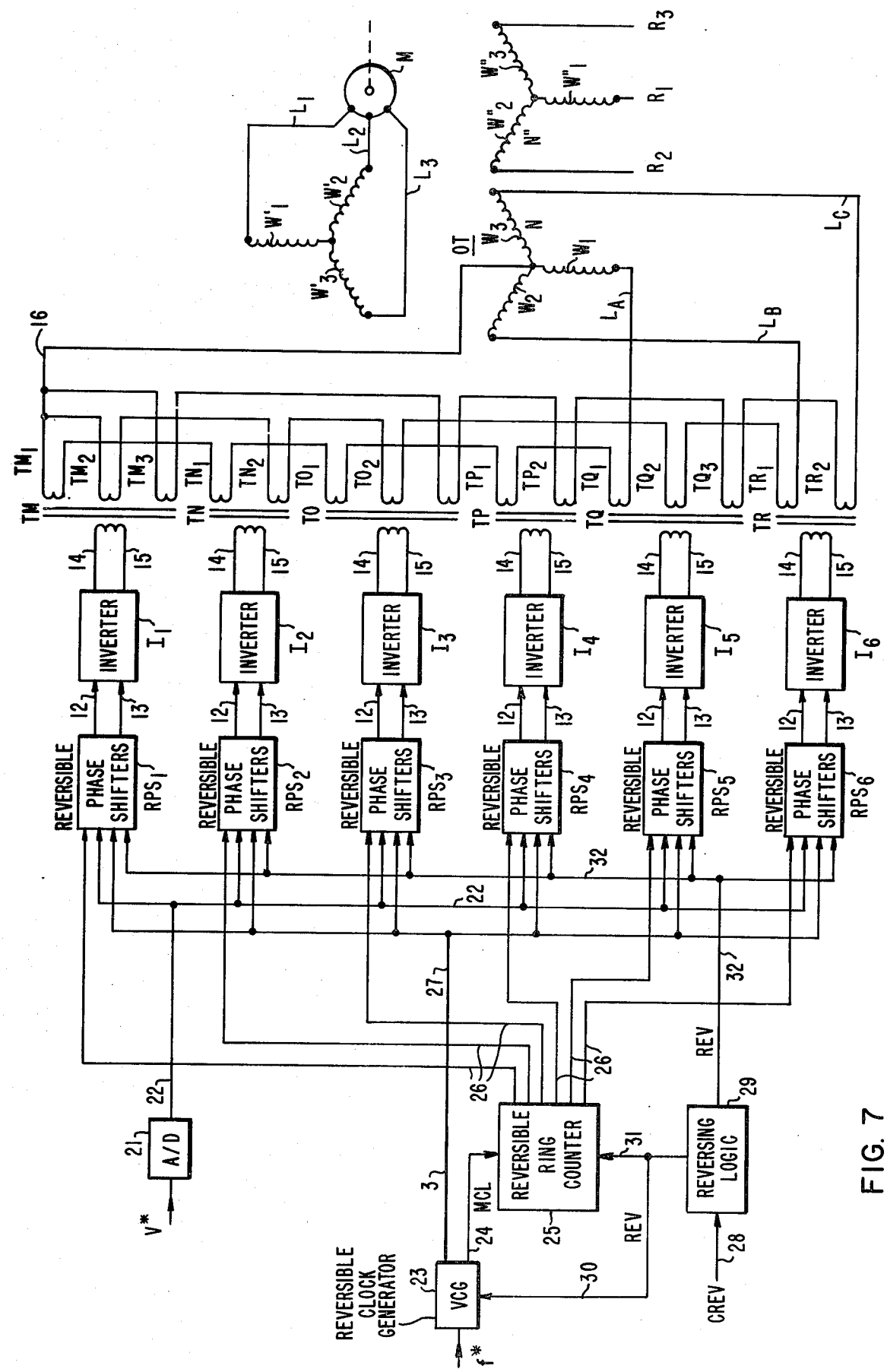
FIG. 7 illustrates the invention in the context of a harmonic neutralization inverter system.

Referring to the drawings, FIG. 7 is a schematic block diagram of a DC to AC converter of the type disclosed in the aforementioned U.S. Pat. No. 3,491,282 of T. M. Heinrich et al, embodying voltage control in accordance with the present invention.

Typically, the DC to AC converter of FIG. 7 uses six inverter stages M-R for harmonic neutralization. Each inverter is supplied via line 11 with direct current voltage derived from a rectifier circuit 60 converting the 60 hertz AC power supply into direct current voltage. The inverters are sequentially and cyclically controlled by paired output signals on lines 12, 13 from six respective reversible phase shifters $RPS_1$–$RPS_6$. The paired output lines 12, 13 define a pulse width establishing a period of conduction for the corresponding stage of the inverter arrangement shown in FIG. 5.

In accordance with the teachings of the Heinrich patent, inverters $I_1$-$I_6$ generate at their respective outputs 14, 15, identical square pulses which are shifted by a phase angle $\pi/6$ between each stage. For the purpose of this disclosure the description of the U.S. Pat. No. 3,491,282 of T. M. Heinrich is incorporated by reference therein. As disclosed in the Heinrich Patent, the square waves generated between lines 14, 15 are amplified by respective transformers (TM-TR). The dimensioning ratios of the transformers follow a cosine law from one stage to the next and the secondary windings of the transformers are combined in series so as to sum up the dimensioned square waves and form a sinusoidal wave such as shown at (f) in FIG. 8 for phase A and output line $L_A$. Typically, with six stages, only five windings TM, TN, TO, TP, TQ are serially connected to provide the sinusoidal wave of one phase. Thus, windings $TM_1$, $TN_1$, $TO_1$, $TP_1$ and $TQ_1$ generate the sinusoidal wave applied to winding $W_1$ between line $L_A$ and neutral point N, for phase A. In the same fashion, for phase B, windings $TM_2$, $TN_2$, $TO_2$, $TQ_2$ and $TR_2$ are serially connected to supply winding $W_2$ with a sinusoidal wave at 120° from winding $W_1$. The third phase $W_3$ is supplied by serially connected windings $TM_3$, $TO_3$, $TP_2$, $TQ_3$ and $TR_3$, respectively. These windings $W_1$, $W_2$, $W_3$ are the primary windings of an output transformer OT. The ratios of the windings of transformers TM, TN, TO, TP, TQ and TR are indicated in a table shown on FIG. 9. FIG. 10 shows graphically how the five vectors dimensioned in accordance with the table are summed up by the serially connected secondary windings, for each phase. The primary winding $W_1$ of the three phase output transformer OT is connected between line $L_A$ and connection 16 to neutral point N. Similarly, windings $W_2$, $W_3$ are connected between neutral N and lines $L_B$, $L_C$ respectively. In FIG. 8, the fundamental sine wave generated for phase A between line $L_A$ and neutral N is shown by reference to the dimensioned square wave (a) to (f) derived from inverters $I_1$-$I_6$ in accordance with the table of FIG. 9. The secondary of output transformer OT includes windings $W_1'$, $W_2'$, $W_3'$ which supply AC power via lines $L_1$, $L_2$, $L_3$ to the load, namely an induction motor. The motor is operated at variable frequency adjusted by changing the setting of the voltage control oscillator 1 controlling the frequency of signal B. The frequency of the VCO is set by a reference signal on line 6 and regulated if desired by a feedback signal derived from a tachometer coupled on the axis of the motor.

The output on lines $L_A$, $L_B$, $L_C$ depends on the width of the individual square pulses which, as shown in FIG. 8 for phase A, build up the fundamental sine wave. Voltage control has been described in the aforementioned United States patent of Heinrich, and in the paper entitled "Static Inverter With Neutralization Of Harmonics" by A. Kernick, J. L. Roof and T. M. Heinrich presented at the AIEE Aero-Space Transportation Conference in Philadelphia, June 26-30, 1961.

While voltage control has been disclosed in the Heinrich patent either by pulse width modulation or by phase shift, the present invention uses only phase shift modulation.

Voltage transformer VT provides between the secondary windings $W_1''$, $W_2\Delta$, $W_3''$ and lines $R_1$, $R_2$, $R_3$ voltage feedback signals which are applied to a voltage regulator 30 in order to adjust the output voltage on lines $L_A$, $L_B$, $L_C$ in relation to a reference voltage $v_R$ also applied to the voltage regulator 30 through a transducer 31. (See FIG. 6).

Any pair of lines 12, 13 outputted by reversible phase shifters $RPS_1$... $RPS_6$ controls the time duration that the DC voltage is applied to the load in each power stage (conduction angle), and the particular arrangement ensures that this control is performed in an identical manner for each stage. The outputs on lines 12, 13 are the logic command signals applied as gate control to the inverters thus determining the width of the square pulses used in reconstructing the fundamental outputted sinusoidal wave (see curve (a) on FIG. 13). The magnitude of such width depends on the amount that the pairs of command signals on lines 12, 13 are shifted from one another which in turn depends on a reference voltage v* shown in FIG. 7 to be applied to an A/D converter 21 with the digital signal k at the output thereof being applied as a reference to each of reversible phase shifters $RPS_1$... $RPS_6$ for control.

Referring to FIG. 7 again, the overall circuitry for controlling phase shifters $RPS_1$-$RPS_6$ is shown on the left side. It is observed that the phase shifters are reversible contrary to conventional phase shifters in harmonic neutralization where operation is contemplated without speed reversal. As earlier mentioned for voltage control, a voltage reference signal v* is applied to an A/D converter 21 in order to provide a digital signal k applied via lines 22 to all phase shifters $RPS_1$-$RPS_6$. For speed control, a frequency reference signal f* is applied to a reversible clock generator 23 embodying a voltage controlled oscillator outputting a clock signals having a frequency controlled by the f* signal. The outputted signal MCL on line 24 establishes the $\pi/N$ spacing between stages. This signal is applied to the reversible ring counter 25 acting as a distributor via lines 26 to gate in sequence all the stages of $RPS_1$-$RPS_6$. A master clock signal DCL synchronizes the logic operation. Also outputted by circuit 23 are signals $CLPH_1$, $CLPH_2$, $CLPH_3$ which are applied via lines 27 to the respective phase shifters $RPS_1$-$RPS_6$. The function and nature of signals $CLPH_1$, $CLPH_2$, $CLPH_3$ will be explained later. A reverse command signal CREV is applied on line 28 to a reversing logic circuit 29 which generates a digital signal REV. This signal REV has three concurrent functions. First, on line 30 to circuit 23, digital signal REV inposes one of two directions of operation for the reversible clock generator 23. As a result, digital signals on line 27 are capable of being applied with a reversed logic. Secondly, signal REV is also applied via line 31 to the ring counter 25. As a result, the gating order to the stages $RPS_1$-$RPS_6$ and inverters M-R may be reversed. Thirdly, signal REV on line 32 is applied to the logic of reversible phase shifters $RPS_1$-$RPS_6$ defining two opposite logic states within these circuits, as explained hereinafter. The circuit of FIG. 7 will be considered in more detail with regard to the particular circuitry used and the overall operating mode. The preferred embodiment hereinafter described differs from the circuit of FIG. 7 in that instead of six stages (for the inverter and the reversible phase shifters), for practical reasons, twenty-four are used in fact. The invention will now be described by reference to FIGS. 11 to 17 in this particular context.

Figure 11:
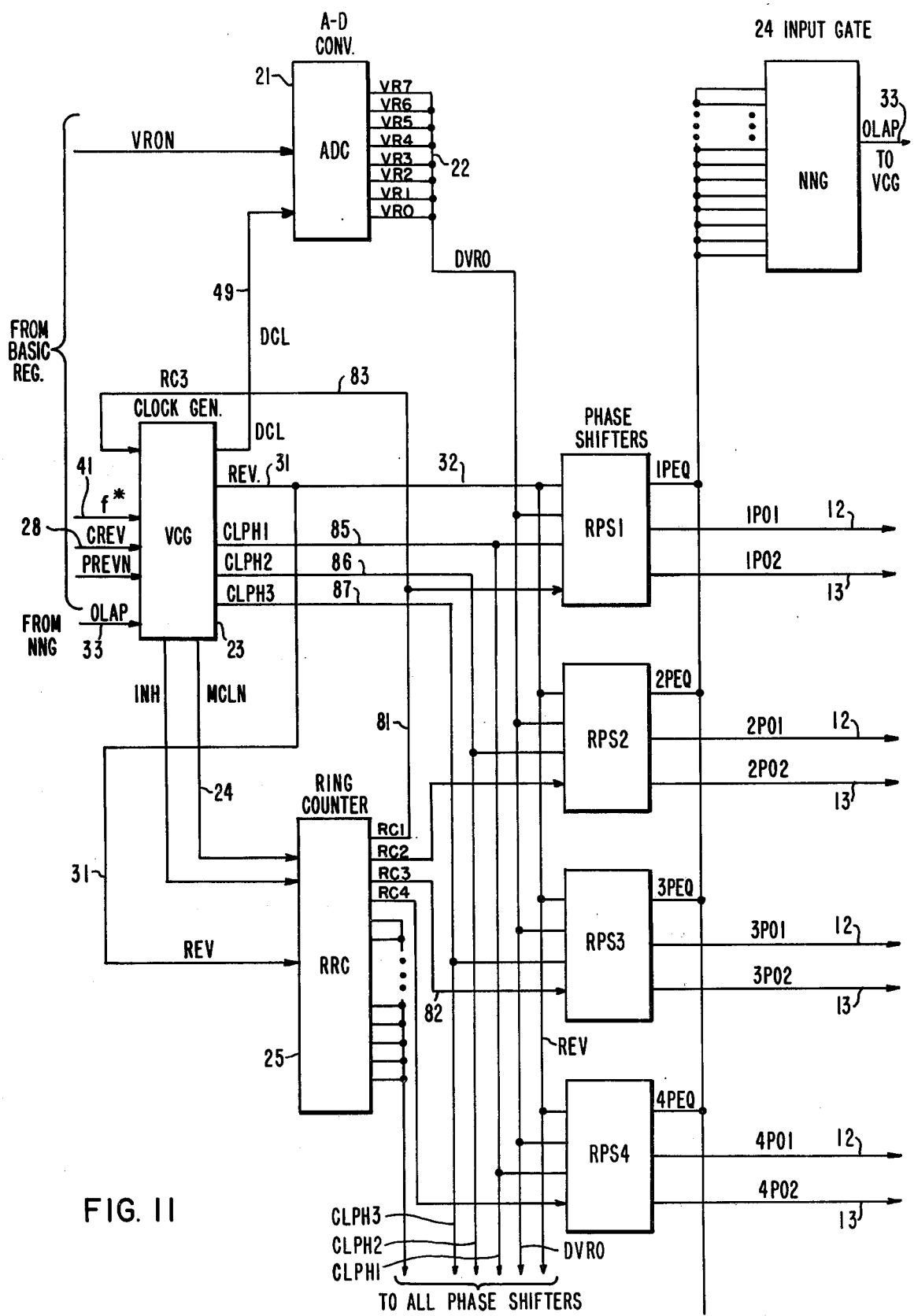
FIG. 11 shows logic circuitry used to modulate the phase shifters of FIG. 7.

FIG. 11 shows in more detail the logical coordination of circuits 23 (reversible clock generator), 21 (A/D converter), 25 (reversible ring-counter) and the phase shifters ($RPS_1$-$RPS_6$) of FIG. 7.

Figure 12:
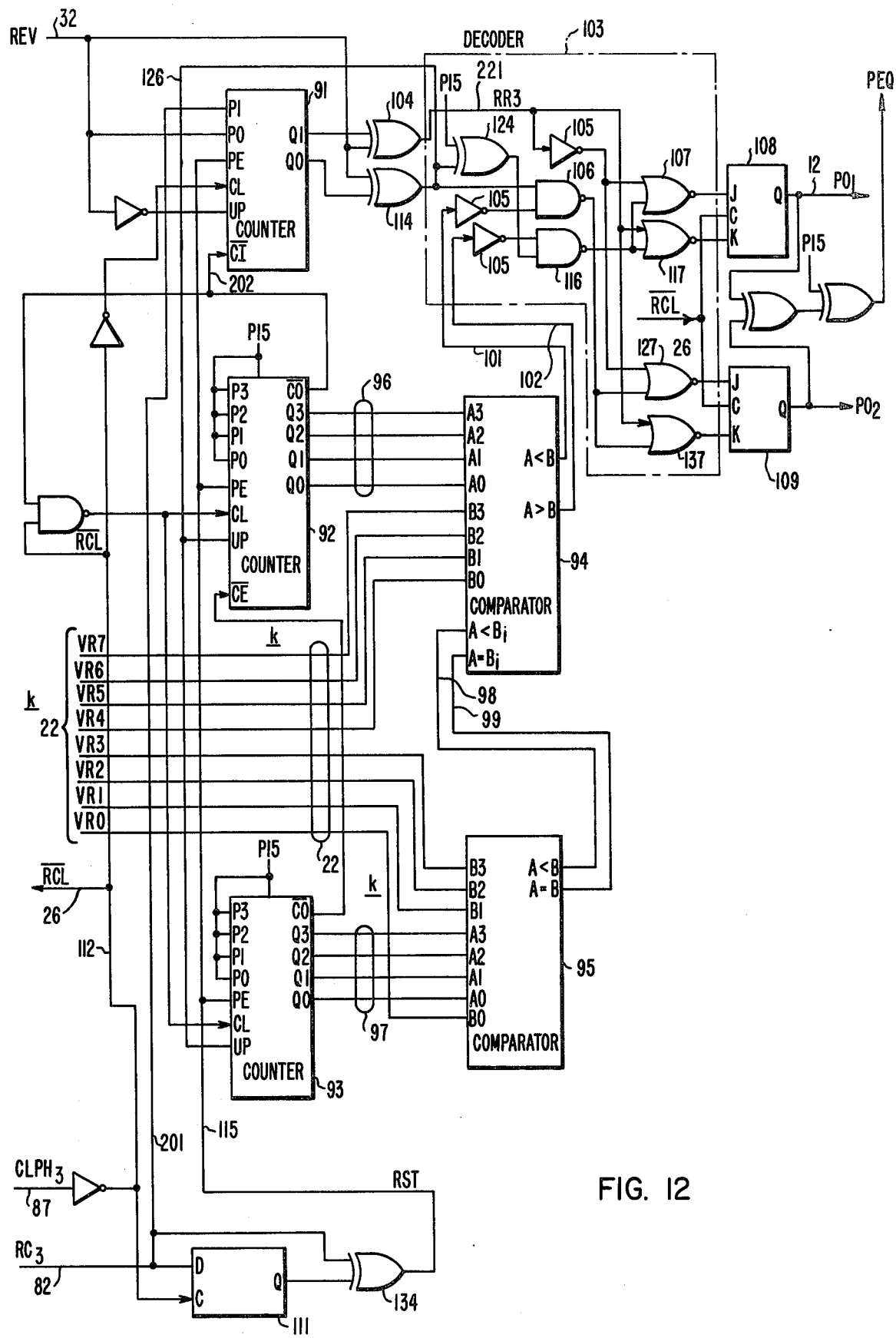
FIG. 12 illustrates a reversible phase shifter for implementing the circuitry of FIG. 7.

FIG. 12 provides the specific solid state circuitry implementing the functions of reversible phase shifter $RPS_3$ for outputting control signals $PO_1$, $PO_2$ on lines 12, 13 to the associated inverter for stage three. The same circuitry is used for the other stages.

Figure 13:
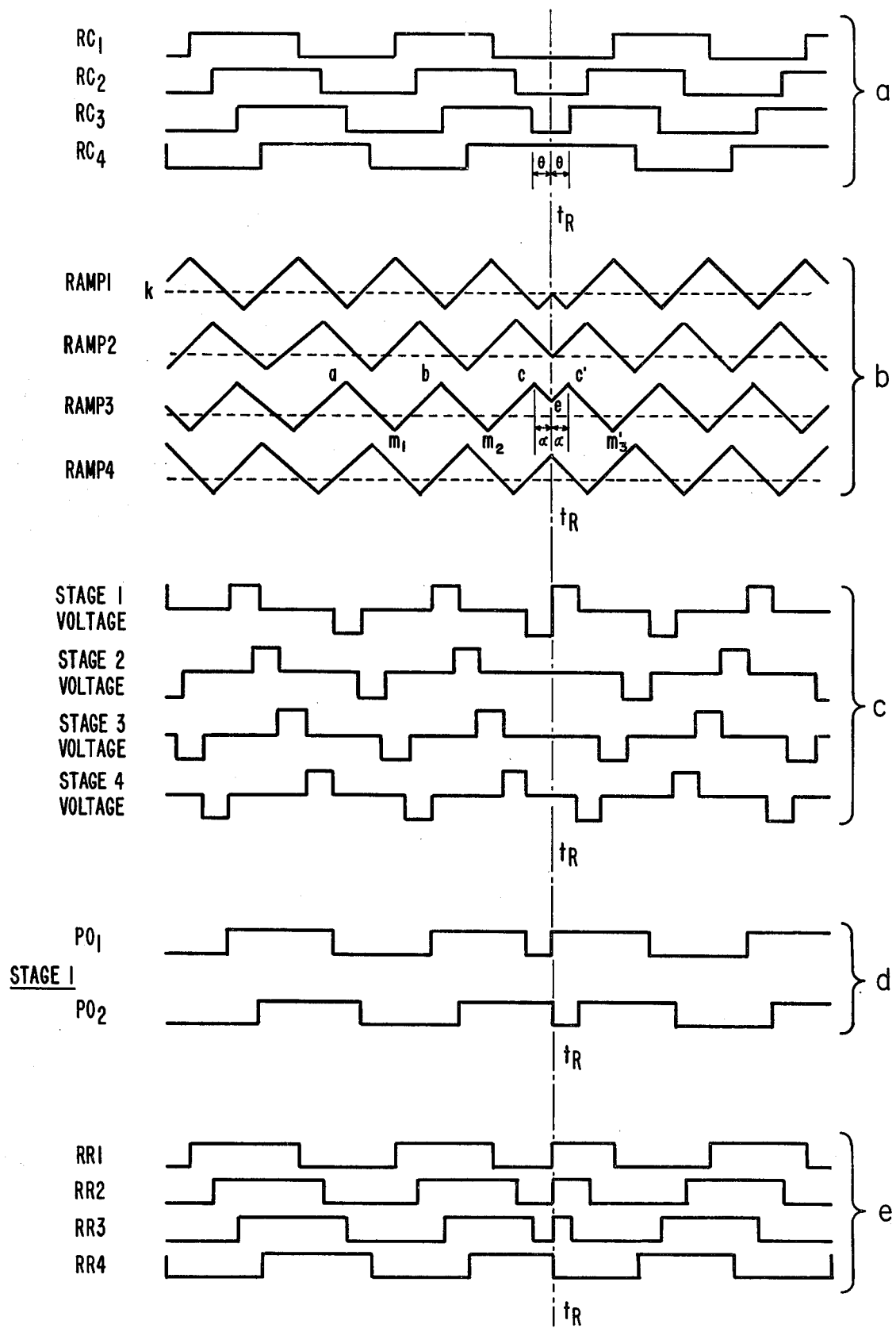
FIG. 13 shows the switching signals as they appear before and after reversal control.

FIG. 13 explains with curves the controlling mode for the generation of a sinusoidal wave by the inverter-stages for two successive directions of rotation at the instant of reversal.

Figure 14A:
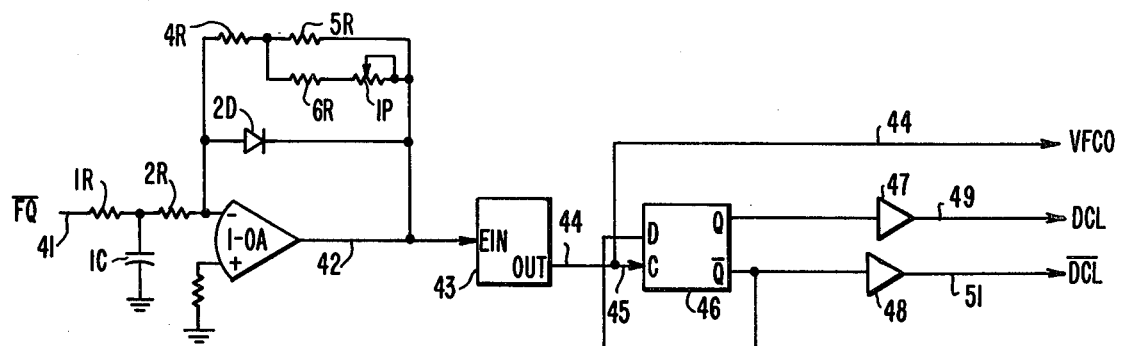
FIGS. 14A, 14B and 14C together form specific circuitry for the reversible clock generator of FIG. 11.
Figure 14B:
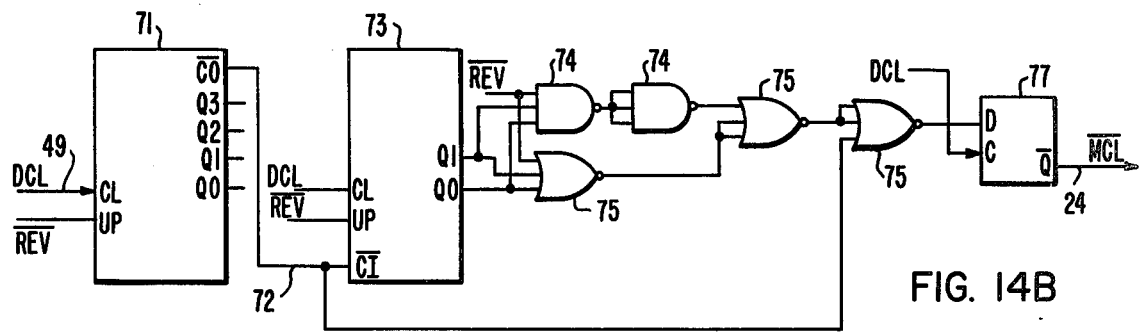
Figure 14C:
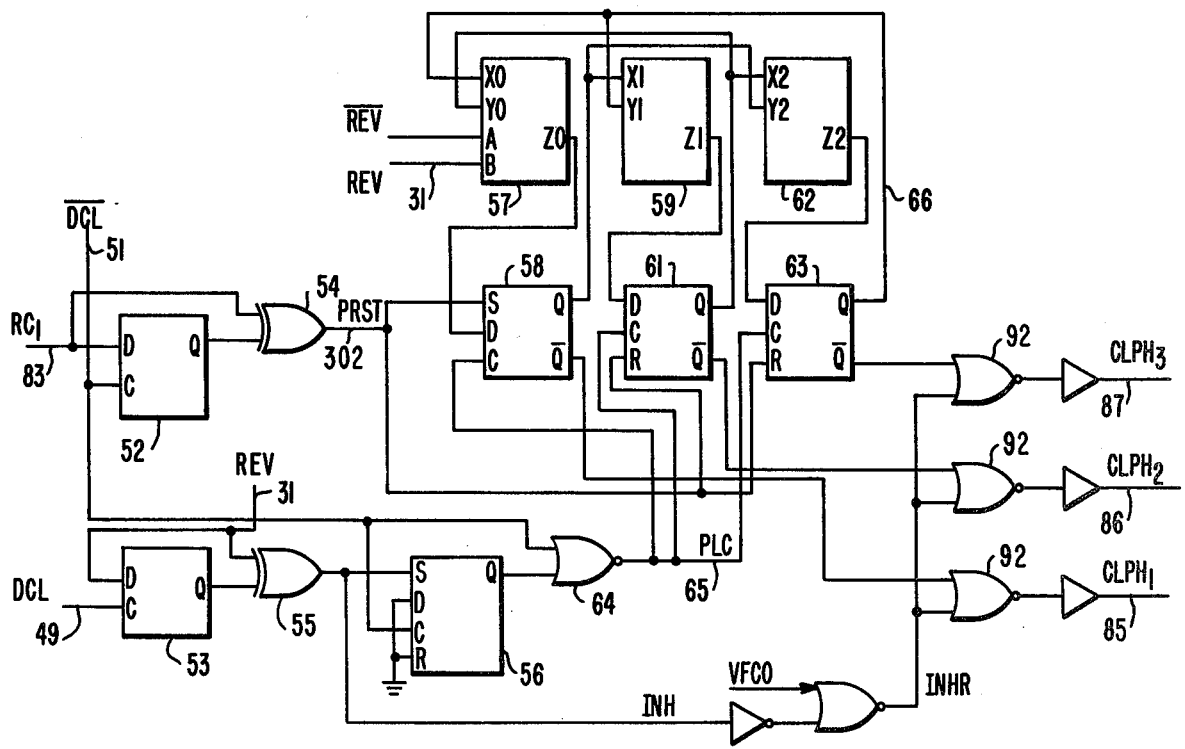

FIGS. 14A, 14B and 14C illustrate the internal organization of the reversible clock generator 23 of FIG. 7.

Figure 15:
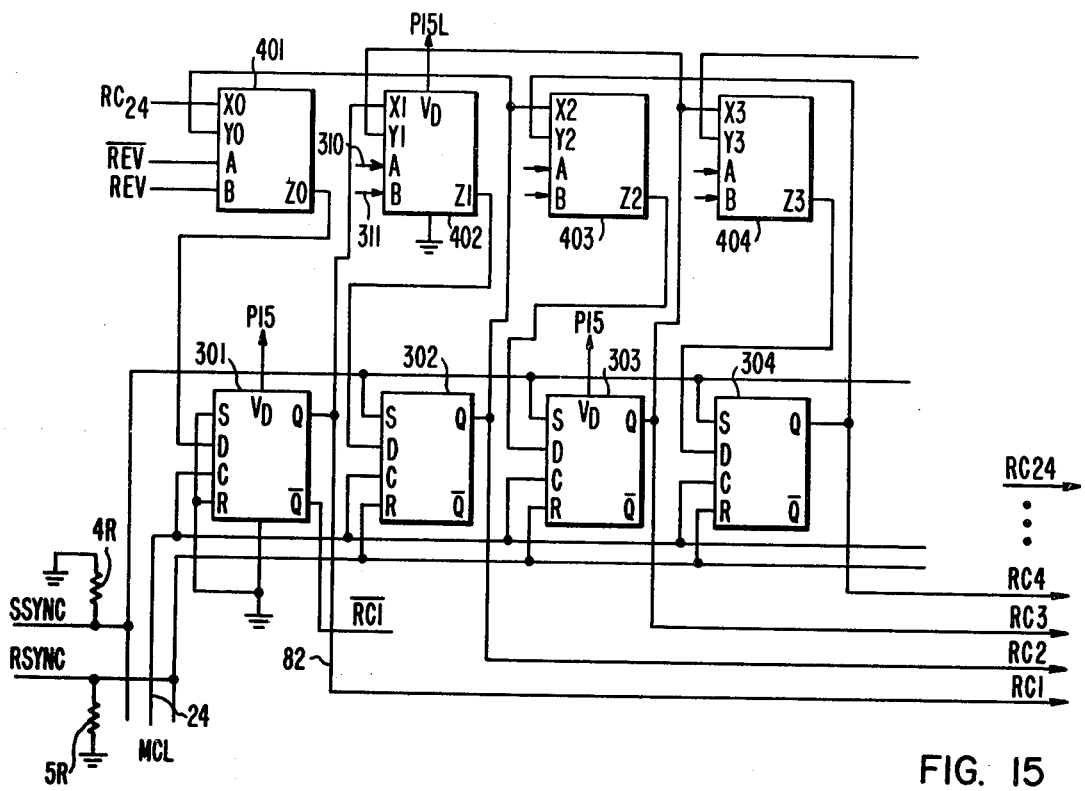
FIG. 15 shows a reversible ring counter used to implement phase sequence reversal in the embodiment of FIG. 7.

FIG. 15 shows a reversible ring-counter (25 in FIG. 7) suitable to control the sequence of the phase shifters.

Figure 16:
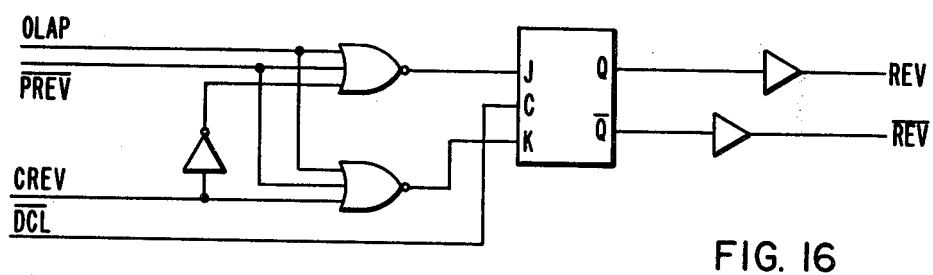
FIG. 16 is a typical reversing logic circuitry for the embodiment of FIG. 7.

FIG. 16 is the reversing logic circuit (29 in FIG. 7) used for translating into a digital signal REV the command for reversal CREV.

Figure 17:
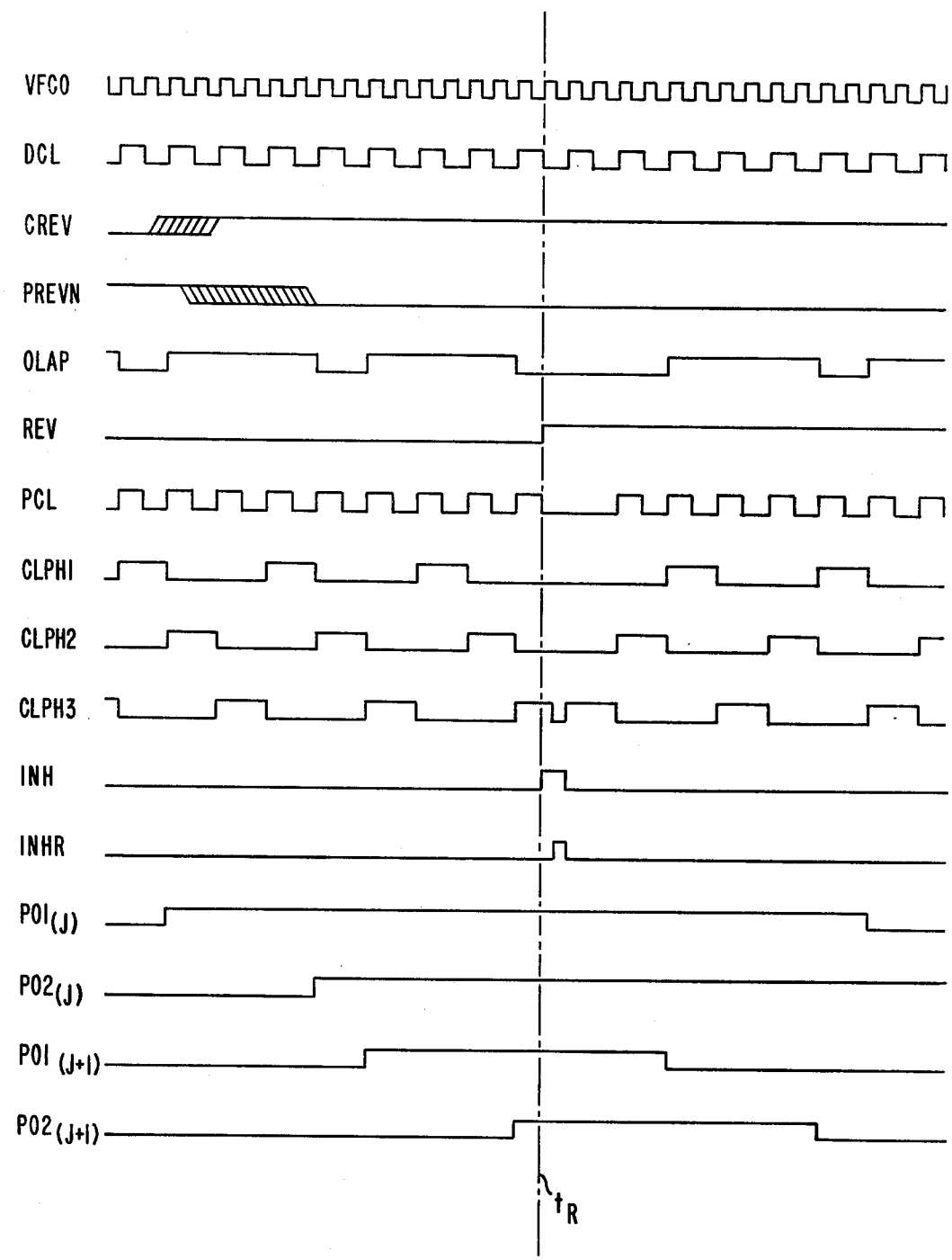
FIG. 17 is the timing diagram including signals for inhibiting reversal in case of overlapping stage pulses.

FIG. 17 provides curves which explain the operation of a protective feature preventing reversal at times when the conducting periods between the inverter stages are overlapping.

Referring to FIG. 11, an 8-bit A/D converter 21 converts the v* voltage reference signal into an 8-bit digital signal k on lines 22 ($VR_0$–$VR_7$) which are applied to the reversible phase shifters $RPS_1$–$RPS_{24}$. The ring counter RRC is controlled by a clock signal (MCL) on line 24 and gated by signal INH (inhibit) from the reversible clock generator 23. The latter signal will be explained hereinafter in relation to FIG. 17. RRC generates in a known fashion (see FIG. 15) signals $RC_1$, $RC_2$ . . . $RC_{24}$ of FIG. 13 (see curves under (a)). Signal $RC_3$ is shown on line 82 going to $RPS_3$ from circuit 25. The reversible phase shifters also receive one of signals $CLPH_1$, $CLPH_2$, $CLPH_3$ (on respective lines 85, 86, 87 of FIG. 11, or 27 of FIG. 7), and the reverse digital signal REV on line 32.

The reversible phase shifter itself will now be considered by reference to FIG. 12. The above stated inputted control signals are recognized on the Figure. Line 22 is for the K signal; line 32 is for REV. The reversible phase shifter of FIG. 12 is assumed to be the third one, $RPS_3$. Thus, line 87 is for $CLPH_3$, and line 82 is for $RC_3$, as will be understood from the following explanations.

The phase shifter proper is formed by two flip flops 108, 109 (right side of FIG. 12) whose latch states create at the output two signals $PO_1$, $PO_2$ on respective lines 12 and 13 to the associated inverter $I_3$ of the third stage. Signals $PO_1$, $PO_2$ are shown for stage 3 under (d) on FIG. 13. The difference between these two signals defines the stage 3 voltage pulses shown under (c). The same applies to the other stages.

Referring again to FIG. 12, it will be considered now, how within the reversible phase shifter $RPS_3$:

(1) a series of ramps are generated to form a time representation of the four quadrants of an outputted sinusoidal wave (see FIG. 13 under b);

(2) at a level defined by signal k on lines 27, the ramp is intersected in order to generate $PO_1$ and $PO_2$;

(3) the polarity of the half-cycle reference (signal RC) is inverted by signal REV, as it appears from the from of the generated signals RR ($RR_3$ on line 221 from device 104 on FIG. 12);

(4) the reverse signal REV of line 32 at instant $t_R$ causes a reversal in the time progression of curves a, b, c and e, after $t_R$.

The ramp function of stage 3 (RAMP3 on FIG. 13) is generated by the combination of counters 91, 92, 93. The ramps are clocked by signal ClPH3 (line 87) which via line 112, and the shown logic conversions, is inputted into the CL pin of each counter. Counter 92 and 93 are 4-bit counters creating the ramps at their outputs $Q_0$–$Q_3$ which are to be compared with the k signal of lines 22 inside comparators 94, 95. This technique is known, and can be found in U.S. Pat. No. 4,017,744 of F. O. Johnson or in the aforementioned copending application Ser. No. 774,726, filed Oct. 1, 1976 by A. Abbondanti. Counter 91 is a one-way counter controlling the direction of the ramp. Counter 91 is initiated by the signal $RC_3$ on lines 82 and 201 connected to the pi pin of the counter. It is reset when clocked by $CLPH_3$ into D flip flop 111 and Exclusive OR device 134 to form signal RST on line 115 to all three counters 91, 92, 93. Counter 91 counts up to its full count during which time its output $Q_0$ and Exclusive OR device 114 define an UP signal (positive slope). When counters 91, 92, 93 are initialized by a preset signal (RST on line 115), counting by 92 and 93 is started downward (negative slope for the first quadrant) and the UP signal of line 126 from device 114 to the UP pin of the counters is low (DOWN). When counter 91 has reached its full count, counters 92 and 93 by line 126 turn around and are being filled back to 255 (positive slope for the second quadrant). If at any time $t_R$ the REV signal commands a reversal on line 32, the Exclusive OR device 114 will change the state of line 126 to its opposite logic state. As a result, the counting direction of 92 and 93 will be reversed, as shown on FIG. 13B.

The ramp clock $CLPH_3$ on lines 87, 112, is synchronized with the ring-counter signal $RC_3$ by the effect of the preset signal PRST generated on line 302 of FIG. 14C by D flip-flop 52 and Exclusive OR device 54. The transition of signal $RC_3$ is detected by the combination of a D flip-flop 111 and an Exclusive-OR device 134 in order to generate signal RST. When preset by RST, all counters receive their initial value. Counter 91, at that time (which is an UP counter) initiates counting together with counters 92, 93 (which are UP-DOWN counters). When counter 91 has reached its maximum count, $Q_0$ changes and via exclusive OR device 114 and line 126 the direction of counting of counters 92, 93 is changed (UP is now high). Therefore, the ramp goes UP from the zero axis of RAMP3 (FIG. 13), in the second quadrant. When counters 92, 93 are filled, signal RST presets again all counters and the counting process starts again with counters 91, 92, 93. It is seen that signal RST which is clocked via a D flip-flop 111 and Exclusive OR device 134, establishes the peaks of the ramps in synchronism with $RC_3$ (line 82) from the ring-counter and $CLPH_3$ (line 87) from the master clock. The $RC_3$ curve is shown in FIG. 13 under (a). It is also seen from FIG. 12 that the state of pin $Q_1$ of counter 91 (which reproduces the pin $P_1$ state as defined by $RC_3$ is carried onto line 221 via Exclusive OR 104. Thus, assuming signal REV from line 32 is in its low state (left of $t_R$) signal $RR_3$ (see FIG. 13 under (e)) is identical to $RC_3$ up to time $t_R$. At the instant of reversal REV changes the output state of device 104 and signal $RR_3$ becomes inverted in relation to $Q_1$ and $P_1$, as shown on the right side of curve $RR_3$ (see (e) on FIG. 13).

Returning to counters 92, 93 of FIG. 12, the ramp signals (RAMP3) are outputted via lines 96 (4-bit) and 97 (another 4-bit) then applied to the A inputs of respective comparators 94, 95. The 8 bits of reference signal k ($VR_0$–$VR_7$) are applied in order of significance to the respective B inputs of comparators 95, 94. As a result, the relations A<B and A>B are provided in accordance with Boolean algebra on lines 101 (A<B) and 102 (A>B).

The operation of the reversible phase shifter of FIG. 12 will now be considered by reference to FIG. 13 and RAMP3 under (b). The ramp is like the ramp of FIG. 1B. It goes through successive sine wave cross overs a, b, c, c' and sine wave peaks $m_1$, $m_2$, $m'_3$ across the instant of reversal $t_R$, with a turn-around point e at instant $t_R$, e.g. at an electrical angle $\alpha$ from cross-over point C. C', as explained by reference to FIG. 1B, lies at a reference angle $2\alpha$ from cross-over point C. This will be explained from a consideration of the operation of counters 91, 92, 93 of FIG. 12, and signal REV on line 32 which changes state at instant $t_R$.

When REV changes state, the polarity of signal $RR_3$ on line 221 after Exclusive OR device 104 is inverted, as earlier mentioned. Also, the polarity of the UP signal of line 126 is inverted due to Exclusive OR device 114. This means that the ramp which from C to E was going DOWN (negative slope) is now changing to positive slope (in accordance with the present state of the UP signal on line 26 to the UP pin of the counters). Counting will now proceed until the CARRYOUT CO from line 220 into the CARRYIN CI of counter 91 indicate that cross-over point c' has been reached. Since counters 92, 93 are UP-DOWN counters, this will occur exactly after the same time duration $\alpha$ that it took from cross-over c to instant $t_R$. If $t_R$ had occurred instead when the ramp was goin up as for RAMP1, with REV the slope would have changed to negative while counter 92, 93 could be emptying. The turn-around will again take place when the CARRYOUT CO into the CARRYIN CI indicates that the sine wave peak has been reached. It is noted, however, that signal REV is also applied to the $P_0$ and to the UP pins of counter 91. When applied to the $P_o$ pin, signal REV causes $Q_o$ to maintain the slope negative at the crossover point (e.g. when RST comes in at PE). When applied to the UP pin, signal REV reverses the counting direction of 91 and therefore a mirror image of the $Q_o$ and $Q_1$ signals is created from $t_R$ on. It appears that time reversal on the pulse voltage signal time characteristic is brought about by REV on the UP pin of counter 91, while polarity reversal is effected by REV directly on device 104. On the other hand, for the slope signal it is seen that due to the $P_o$ input from REV a time reversal of $Q_o$ is obtained, whereas polarity reversal of the slope signal is caused by REV being directly inputted into device 114.

It is recalled that during forward speed (left of $t_R$) the ring-counter is sending staggered waves $RC_1$ $RC_2$ ... $RC_{24}$ which, via line 82 for $RC_3$, cause by PE a ramp reversal due to presetting of all the counters (RST on line 115).

Referring to FIG. 15, the ring counter is shown as a reversible ring counter. FIG. 15 only shows four elements of a ring and the outputted lines for the RC waves. It is understood that for 24 stages, there are actually 24 such elements generating twenty four staggered waves such as $RC_1$-$RC_4$ of FIG. 13. These elements each consists in a D flip flop such as 301, 302, 303 having a data input D and a Q output. Under control of the ring clock signal MCL on line 24, the D flip flops are toggled together while assuming the state of the D flip-flop preceding it in the ring. Reversibility is provided by data router devices 401, 402, 403, 404, each associated with one pair of consecutive D flip-flops of the ring. These data routers have an x and a y input which is selected by a switch position determined by the logic of inputs A B, and a z output corresponding to the selected x or y input. A receives $\overline{REV}$ on line 310 for data router such as 402 and B receives REV. Thus, at the instant of reversal $t_R$, the logic of A and B is reversed so that the operative input passes from $x_1$ to $y_1$. $x_1$ is connected to the Q output of 301, while $y_1$ is connected to the Q output of 303, and z is connected to the D input of 302. It is seen that in the forward direction data from 301 passes to D of 302 while after instant $t_R$, data is passed from 303 to 302 by the operation of 402 being in the reverse state. In this fashion, reversal of the stage sequence of the ring counter is easily controlled by signals $\overline{REV}$, REV when applied on lines such as 310 and 311. It is recalled that the sequential changes of state by ring counter action occur in timing with signal $\overline{MCL}$ on line 24, from stage to stage along the ring.

Turning now to FIG. 14B, the figure shows a frequency divider which reduces the frequency of the master clock signal DCL on line 49 down to (1/64) of it, to form on line 24 signal $\overline{MCL}$ mentioned before in relation to FIG. 15. The frequency divider comprises two counters 71, 73 mounted in cascade by line 72 and a decoder including NAND devices 74 and NOR devices 75, and a D flip flop 77 timed by the master clock signal DCL to output signal $\overline{MCL}$ on line 24. Counters 71 and 73 are UP-DOWN counters. They are controlled by the reversal signal $\overline{REV}$ at the UP pin input, whereby at instant $t_R$ the direction of counting is reversed. It is known that whenever in the middle of a count by 71, 73, the direction of counting is reversed, mainly at $t_R$, the counter will empty itself, thus establishing the same time interval from initial value of the counters. Therefore, from the last $\overline{MCL}$ pulse generated on line 24 the time angle $\theta$ expanded at instant $t_R$ will be counted back by counters 71, 73, generating another pulse MCL exactly another time angle $\theta$ after instant $t_R$. It is seen that all RC curves generated after $t_R$ are the mirror image of those before $t_R$. Returning to FIG. 12, it is clear that at C' (thus at an angle $\alpha$ from $t_R$) following ramping UP of counters 92, 93, signal $RC_3$ will cause counters 92, 93 to count in the opposite direction (DOWN) toward $m'_3$. The combination of the reversible counter of FIG. 15 and the reversible clock generator of FIG. 14A has introduced a mirror image effect which is exactly timed with the half cycles of the intended outputted wave of frequency $f_o$.

There are 24 stages and each of the 24 RC curves of FIG. 13 are at $(\pi/N = \pi/24)$ from each other. On the other hand, for one stage the ramp generated by counters 92, 93 is translated into logic comparison signals on lines 101, 102 (FIG. 12) which are combined into decoder 103 with the UP or slope signal from device 114 and the half-cycle polarity signal RP from device 104. The decoded output signals are $PO_1$ and $PO_2$ (lines 12 and 13) obtained from respective latches 108, 109. The derivation of signals $PO_1$, $PO_2$ with the aforementioned given signals is conventional. Signals $PO_1$, $PO_2$ on lines 12, 13 of the stage 3 control the width of the outputted square-shaped voltage of inverter $I_3$. Like signals RC of curve (a) in FIG. 13, the RR signals of curves (e) and the pair of $PO_1$, $PO_2$ signals for the various stages, are 24 in number and spaced by $(\pi/N)$ from each other.

The ramps are generated by 8-bit counters, thus the digital numbers on lines 96, 97 have a spread of 0 to 255, forming 256 steps on each ramp. These ramps are synchronized with each cross-over of the fundamental wave by signals RC. Thus, between two peaks of RAMP3 (FIG. 13) there is a time interval of twice the number of steps which also represents $(1/2f_o)$ ($f_o$ being the frequency of the fundamental wave).

If L is the number of steps per ramp (L=256 in the example) the ramp clock frequency is $4LF_o$. Since the RC curves are at $(\pi/N)$ from each other, the period of a ramp is to be divided by N in order to exactly accommodate N inscribed ramps. In other words, the ramps (due to signals RC on line such as 81 of FIG. 11 as applied to the respective stages) are spaced by (2L/N) clock pulses. In general, (2L/N) is not an integer, so that it is not possible to place so many ramps as there are stages, equally spaced by the ring counter 25, into the $1/2Lf_o$ time interval of a half-cycle of the fundamental wave. In order to overcome this, p phases of the ramp clock are generated for providing equal ramp spacings in the order so generated. "p" is the smallest integer multiplier of (2L/N) with an integer product. The minimum frequency to generate the "p" ramp clocks is $4LPf_o$. Since the master clock drives both the ramp and ring-counter generators, its frequency should be the least common multiple of their inputs "R". The ring counter 25 is at the frequency $2Nf_o$ which is obtained from the master clock signal DCL with a division by "R". Therefore, the master clock frequency should equate $2NRf_o$ and $4LPf_o$. $DCL = 2NRf_o = 4LPf_o$ therefore, R=(4Lp/2N) and $DCL = 2NRf_o$. In the example of FIGS. 11 to 17, R=64 and p=3 since (2L/N=(2×256/24). The smallest integer is 3. Thus, three signals $CLPH_1$, $CLPH_2$, $CLPH_3$ are provided grouping the 24 ramps (RC and RAMP) by groups of eight. $CLPH_1$ will control $RAMP_1$ (line 81). $CLPH_2$ will control the second stage. $CLPH_3$ the third stage, then $CLPH_1$ for stage 4 and so on for every three ramps.

Referring to FIG. 14A, a voltage controlled oscillator 43 is provided for generating in response to the frequency reference signal f* (via operational amplifier 1-OA and line 42) an output signal VFCO (line 44) translated into logic signal pulses DCL on line 49, $\overline{DCL}$ on line 51, via a D-flip flop 46. This is the master clock signal at $2NRf_o$. It has been shown by reference to FIG. 14B how signal DCL is divided by R=64 in order to derive on line 24 the ring-counter clock signal $\overline{MCL}$. The divider is reversible and provides as shown earlier the mirror image of the $\overline{MCL}$ signal at the instant of reversal due to $\overline{REV}$ being applied to the UP pin of counters 71, 73 and as a result of the logic of the decoding circuit (74 and 75).

Referring now to FIG. 13C it will be shown how are derived the three signals $CLPH_1$, $CLPH_2$, and $CLPH_3$ and how upon reversal (REV) each signal is caused to emerge at instant $t_R$ with a reversal of the sequence of these signals. There is a similarity of purpose with what is done with signals RC, and also a similarity in the means used, as will be seen hereinafter.

FIG. 14C essentially comprises a reversible ring counter such as the one of FIG. 15 for the RRC block (25 on FIG. 11). This particular ring counter has p=3 stages, each defined by a two-state device (58, 61, 63 respectively) and an associated data router (57, 59, 62) for reversibility. Toggling goes from right to left, or from left to right in the ring depending upon signals $\overline{REV}$ and REV on inputs A, B of the switches, and either the X data or the Y data passes from one toggled device to the next in sequence. It appears that at the output on lines 85, 86 and 87, signals $CLPH_3$, $CLPH_2$ and $CLPH_2$ (in this order) are generated which control the succession of ramps between the three associated groups of eight reversible phase shifters $RPS_1$–$RPS_{24}$.

The master clock signal $\overline{DCL}$ on line 51 and input C synchronizes a D-flip flop 52 and an exclusive OR device 54 with the $RC_1$ signal on line 83 on the data input (D) of 52. Thus, devices 52 and 54 impart toggling through the ring 58, 61, 63 in the sequence chosen by REV with a proper lineup of $CLPH_1$ with $RC_1$ for stage 1, and so on. It is recalled that the CLPH signals are at $4Lpf_o$, while the RC are at $4Lf_o$.

Referring to FIG. 17, the following signals are shown. VFCO (see FIG. 13A); DCL (see FIG. 13A); CREV and REV (see FIG. 16); $CLPH_1$, $CLPH_2$, $CLPH_3$ (FIG. 13C). FIG. 17 also includes signals not considered up to now, especially PCL, INH and INHR the generation of which will be explained by reference to FIG. 13C.

When the p-stage reversible ring counter of FIG. 13C changes its sequence at $t_R$, something has to be done to start the new sequence. This is provided by device 53 and 55 which upon the clock DCL with REV changing state generate the signal INH (see FIG. 17). Devices 56 (a D flip flop) and 64 (an Exclusive OR) normally generate a signal PCL which is the clock signal of the 3-stage ring counter. When signal INH appears on pin S of device 56, PCL is inhibited (see FIG. 17) thus disabling momentarily the ring counter. Also INH caused by an REV change is converted by inverter 91 and NOR device 67 into signal INHR shown on FIG. 17. As a result of signal INHR which is applied to the second input of NOR devices 92 at the output of the ring counter, all outputs CLPH are forced to zero for the duration of INHR. As a result, a notch appears in $CLPH_3$ (see FIG. 17). When INH disappears, the ring-counter clock signal PCL received from device 64, again clocks all devices of the counter. It is seen from FIG. 17 that the leading edge of all stage signals are symmetrical about $t_R$. When REV changes the direction of the data routers, the succession of CLPH signals is reversed.

FIG. 17 also shows signal OLAP. This signal is derived as shown in FIG. 11 by the coincident circuit NNG which receives 24 signals PEQ such as derived in FIG. 12 in response to $PO_1$, $PO_2$. At times when $PO_1 = -PO_2$, the pulses are equal (PEQ) and the stage voltages are zero. When it happens that $PO_1 = PO_2$ for all stages, all the stage voltages are zero and the pulses outputted by the inverter do not overlap. When they overlap, reversal is not possible. In such instance, a signal OLAP is generated so that neither REV, nor $\overline{REV}$ can change state. This appears from FIG. 16 where the command reverse signal CREV is shown converted into logic signals REV and $\overline{REV}$ as clocked by $\overline{DCL}$, and a NOR device responsive to CREV and OLAP blocks $\overline{REV}$ and REV in their present state.

We claim:

1. In an harmonic neutralized inverter (HNI) drive having an harmonic neutralization wave generator for reconstructing a sine wave electrical system of fundamental frequency $f_o$, an induction motor supplied by said generator, said generator including static means for generating a sequence of N successive square wave signals defining two transitions separated from each other by a predetermined electrical angle, said signals being at $(\pi/N)$ from one another; an N-stage inverter system controlled by said transitions to generate N square-shaped voltages respectively; N transformers having winding ratios distributed in accordance with a cosine law, with N primary windings supplied by said inverter system and combined secondary multi-windings forming amplified N square-shaped voltages to reconstruct said sine wave electrical system; the combination of:

means operative with said static means at a predetermined instant of reversal of the speed of said motor for reversing the sequence of said square-shaped pulses;

means operative with said static means at said instant of reversal for inverting the polarity of said square-shaped pulses;

means operative with said static means for initiating a first subsequent one of said square-shaped pulses to occur at an electrical angle from said instant of reversal equal to the electrical angle evolved from the last preceding one of said square-shaped pulses occurring before said instant of reversal.

2. The HNI drive of claim 1 in which said static means is digital in nature and said initiating means includes means for recurrently generating a digital time representation of the fundamental sine wave for two quadrants;

means being provided for providing a mirror image of said time representation at said instant of reversal.

3. The HNI drive of claim 2 in which said means for generating a digital time representation includes N-reversible counting means each for developing a corresponding ramp signal, said ramp signals being at $(\pi/N)$ from each other, said mirror image providing means being operative to reverse the operation of each of said N-reversible counting means at the instant of reversal.

4. The HNI drive of claim 3 in which said sequence reversing means includes an N-stage reversible ring counter outputting N-square-shaped pulses, the operation of said ring counter being reversed at said instant of reversal.

5. The HNI drive of claim 4 in which said static means includes N-phase shifters controlled by said signal transitions and by said N-square-shaped pulses, each phase shifter being associated with a corresponding said reversible counting means.

6. The HNI drive of claim 5 in which said static means includes N-comparator means each for comparing a voltage reference signal with a corresponding said ramp signal and for providing said predetermined electrical angle with each two signal transitions.

7. The HNI drive of claim 6 in which reversal operation of said static means is inhibited when the said square-shaped voltages are overlapping.

8. The HNI drive of claim 7 in which said voltage reference signal is adjustable to regulate the output voltage of said sine wave electrical system.

9. The HNI drive of claim 8 in which a frequency reference signal is operative with said static means for adjusting the frequency of said transition signals and said square-shaped pulses.

10. The method of reversing the phase sequence of a reconstructed polyphase sine wave electrical system consisting of the following steps:

(a) continuously counting the electrical angle elapsed from an instant of crossover in each phase being reconstructed;

(b) reconstructing from an instant of reversal in each phase a sine wave having phase shifted from the original sine wave by a lagging angle equal to twice the electrical angle counted from the preceding instant of crossover.

11. The method of claim 10 in which the polarity of each sine wave is inverted at the instant of reversal and a sine wave of same characteristics is reconstructed in absolute time reference by counting from the instant of reversal an electrical angle along a trajectory until crossover which is equal to the electrical angle elapsed from the last crossover into the instant of reversal.

12. In an harmonic neutralized inverter (HNI) drive including a generator for generating a polyphase sine wave electrical system by harmonic neutralization with a multi-stage inverter system controlled by a plurality of phase shifters operative relative to a time representation of the fundamental sine wave and controlled by a ring counter synchronized at the frequency of the electrical system in which said ring counter is a reversible ring counter, and an induction motor supplied by said generator, the combination of:

means for reversing the polarity of the outputted sine waves at a predetermined instant of reversal of the speed of said motor;

means for reversing the sequence of said ring counter at the instant of reversal; and means for developing from the instant of reversal a mirror image of said time representation for each of said phase shifters.

13. In an harmonic neutralized inverter (HNI) drive having an harmonic neutralization wave generator for reconstructing at least one sine wave of fundamental frequency $f_o$ from an N-plurality of square-shaped voltages at $(\pi/N)$ from each other with an N-stage inverter system controlled by a set of N-staggered waves at said frequency $f_o$; and an induction motor supplied by said generator, the combination of:

clock generator means for establishing a series of clock signals spaced by $(\pi/N)$;

ring-counter means operative in synchronism with said clock signals for establishing a first set of said staggered waves;

a reversal signal operating at a predetermined instant of reversal of the speed of said motor;

means operative with said clock generator means and responsive to said reversal signal for causing the next clock signal to occur after said instant of reversal to be spaced therefrom by the time elapsed from the last clock signal having occurred before the instant of reversal; and means operative with said ring-counter means and responsive to said reversal signal for reversing the sequence of said staggered waves from the stage corresponding to said last and next clock signals;

whereby a second set of staggered waves is generated from the instant of reversal which is the mirror image of said first set of staggered waves about the instant of reversal.

* * * * *